(12) United States Patent
Yamasaki et al.

(10) Patent No.: US 11,262,696 B2
(45) Date of Patent: Mar. 1, 2022

(54) FILTER, COLLECTING DEVICE, AND IMAGE FORMING APPARATUS

(71) Applicant: FUJIFILM Business Innovation Corp., Tokyo (JP)

(72) Inventors: Shunsuke Yamasaki, Kanagawa (JP); Yasunori Momomura, Kanagawa (JP); Naoki Sambe, Kanagawa (JP); Yasuhisa Gonda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 32 days.

(21) Appl. No.: 16/842,749

(22) Filed: Apr. 7, 2020

(65) Prior Publication Data
US 2021/0080905 A1 Mar. 18, 2021

(30) Foreign Application Priority Data
Sep. 18, 2019 (JP) .............................. JP2019-169333

(51) Int. Cl.
*B01D 46/00* (2006.01)
*G03G 21/20* (2006.01)

(52) U.S. Cl.
CPC ........ *G03G 21/206* (2013.01); *B01D 46/0041* (2013.01); *G03G 2221/1645* (2013.01)

(58) Field of Classification Search
CPC ......... G03G 21/206; G03G 2221/1645; B01D 46/0041; B01D 46/0046; B01D 46/10; B01D 46/002; B01D 2273/30; B01D 46/0043; B01D 46/521; B01D 46/52
See application file for complete search history.

(56) References Cited

U.S. PATENT DOCUMENTS

| | | | | |
|---|---|---|---|---|
| 3,816,982 A * | 6/1974 | Regnault | ................ | B01D 46/48 55/337 |
| 3,935,803 A * | 2/1976 | Bush | ...................... | A61G 10/02 454/189 |
| 4,482,367 A * | 11/1984 | Howeth | ............. | B01D 46/0005 406/172 |
| 5,205,850 A * | 4/1993 | Jenrich | ................. | F01N 3/0217 55/350.1 |
| 5,819,137 A * | 10/1998 | Hoffman | ............... | G03G 21/206 399/93 |
| 5,858,041 A * | 1/1999 | Luetkemeyer | ......... | B01D 46/10 55/385.2 |
| 6,032,804 A * | 3/2000 | Paulson | ................. | B01D 45/12 209/143 |
| 7,479,170 B1* | 1/2009 | Collette | ............. | B01D 46/0041 55/283 |
| 8,238,779 B2 * | 8/2012 | Doshoda | .............. | G03G 21/206 399/92 |

(Continued)

FOREIGN PATENT DOCUMENTS

| | | |
|---|---|---|
| JP | 2006208718 | 8/2006 |
| JP | 2018-049189 | 3/2018 |

*Primary Examiner* — David J Bolduc
(74) *Attorney, Agent, or Firm* — JCIPRNET (57) ABSTRACT

A filter includes a collecting member that has a pleat and collects particles while allowing wind to pass through, and a holding member that holds the pleat at an end in an elongated direction in which the pleat is elongated. The holding member has a wind-passing portion through which wind flowing along the pleat is allowed to pass.

18 Claims, 6 Drawing Sheets

(56) References Cited

U.S. PATENT DOCUMENTS

| | | | |
|---|---|---|---|
| 2002/0157387 A1* | 10/2002 | Hirota | F01N 3/0253 60/296 |
| 2003/0091363 A1* | 5/2003 | Hoffman | G03G 21/203 399/92 |
| 2004/0037582 A1* | 2/2004 | Shin | G03G 15/20 399/93 |
| 2004/0226274 A1* | 11/2004 | Colamussi | F01N 3/0222 55/482 |
| 2005/0081712 A1* | 4/2005 | Koslow | B01D 46/527 95/90 |
| 2005/0098042 A1* | 5/2005 | Colamussi | F01N 3/0222 96/420 |
| 2007/0023349 A1* | 2/2007 | Kyllonen | B01D 46/0046 210/348 |
| 2007/0151906 A1* | 7/2007 | Beer | B01D 35/0273 210/130 |
| 2008/0063425 A1* | 3/2008 | Idehara | G03G 21/1857 399/93 |
| 2008/0086990 A1* | 4/2008 | Kuempel | B01D 46/0041 55/357 |
| 2009/0298413 A1* | 12/2009 | Arold | B01D 46/002 454/158 |
| 2011/0103821 A1* | 5/2011 | Akiyama | G03G 21/206 399/93 |
| 2011/0200494 A1* | 8/2011 | Tanaka | G03G 21/206 422/211 |
| 2011/0211859 A1* | 9/2011 | Shimoyama | G03G 21/206 399/93 |
| 2011/0220586 A1* | 9/2011 | Levitt | B01D 29/606 210/741 |
| 2013/0081224 A1* | 4/2013 | Van Der Kooi | A47L 9/1683 15/349 |
| 2014/0112681 A1* | 4/2014 | Kawashima | G03G 21/10 399/99 |
| 2014/0260994 A1* | 9/2014 | Grider | B01D 46/0041 96/399 |
| 2014/0294427 A1* | 10/2014 | Goda | G03G 21/12 399/93 |
| 2014/0294429 A1* | 10/2014 | Inui | G03G 21/206 399/99 |
| 2015/0030348 A1* | 1/2015 | Wachi | G03G 21/206 399/93 |
| 2015/0117894 A1* | 4/2015 | Nakayama | F24F 7/065 399/92 |
| 2015/0168913 A1* | 6/2015 | Yamaguchi | G03G 21/206 399/92 |
| 2015/0212485 A1* | 7/2015 | Wachi | G03G 15/2017 399/93 |
| 2015/0212486 A1* | 7/2015 | Wachi | G03G 15/2021 399/93 |
| 2015/0277372 A1* | 10/2015 | Satou | G03G 21/206 399/93 |
| 2016/0059173 A1* | 3/2016 | Kuroda | G03G 21/206 399/93 |
| 2016/0160815 A1* | 6/2016 | Martin | B01D 46/525 55/502 |
| 2016/0246254 A1* | 8/2016 | Michibata | G03G 21/206 |
| 2016/0280044 A1* | 9/2016 | Schuenemann | B01D 46/0005 |
| 2017/0050136 A1* | 2/2017 | Poon | B01D 46/125 |
| 2018/0032024 A1* | 2/2018 | Yamashita | G03G 21/206 |
| 2018/0136602 A1* | 5/2018 | Hashimura | B01D 46/2411 |
| 2018/0253045 A1* | 9/2018 | Yukimoto | G03G 15/2039 |
| 2018/0284651 A1* | 10/2018 | Sunayama | G03G 15/0865 |
| 2018/0290153 A1* | 10/2018 | Bannister | B01D 46/002 |
| 2018/0292782 A1* | 10/2018 | Nojima | G03G 15/2017 |
| 2019/0011879 A1* | 1/2019 | Miyazaki | G03G 21/206 |
| 2019/0107796 A1* | 4/2019 | Morita | G03G 21/20 |
| 2019/0212682 A1* | 7/2019 | Kawasaki | G03G 15/16 |
| 2020/0019117 A1* | 1/2020 | Nomura | G03G 15/2064 |

* cited by examiner

FILTER, COLLECTING DEVICE, AND IMAGE FORMING APPARATUS

CROSS-REFERENCE TO RELATED APPLICATIONS

This application is based on and claims priority under 35 USC 119 from Japanese Patent Application No. 2019-169333 filed Sep. 18, 2019.

BACKGROUND

(i) Technical Field

The present disclosure relates to a filter, a collecting device, and an image forming apparatus.

(ii) Related Art

Hitherto, some collecting devices that collect fine particles generated in image forming apparatuses and the like have been proposed for reducing the number of fine particles to be exhausted from the apparatuses. In such a collecting device, exhaust air is made to pass through a filter.

For example, in an image forming apparatus disclosed by Japanese Unexamined Patent Application Publication No. 2018-049189, a straightening vane provided on the upstream side of a filter is moved in accordance with a value representing the number of fine particles generated.

In another image forming apparatus disclosed by Japanese Unexamined Patent Application Publication No. 2006-208718, the surface of a filter is inclined such that a predetermined angle is formed between the direction of the airflow generated by an exhaust device and the direction orthogonal to the surface of the filter, and such that a point projected from the center of the exhaust port of the exhaust device onto the filter in the direction of the airflow is positioned on a side of the filter that is nearer to the exhaust device with respect to the center of the filter.

SUMMARY

In such an image forming apparatus or the like, if, for example, the distance between the filter and the fan or duct for sending air to the filter is short, the area of the filter that contributes to collection may be limited, reducing the collection efficiency. Such a situation may occur not only because of the short distance between the filter and the fan or duct but also because of device configuration including the shape of the duct.

Aspects of non-limiting embodiments of the present disclosure relate to a filter, a collecting device, and an image forming apparatus that exhibit higher collection efficiency than in a case where wind blown along pleats is blocked by a holding member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a filter including a collecting member that has a pleat and collects particles while allowing wind to pass through, and a holding member that holds the pleat at an end in an elongated direction in which the pleat is elongated. The holding member has a wind-passing portion through which wind flowing along the pleat is allowed to pass.

BRIEF DESCRIPTION OF THE DRAWINGS

Exemplary embodiments of the present disclosure will be described in detail based on the following figures, wherein.

DETAILED DESCRIPTION

Figure 1:
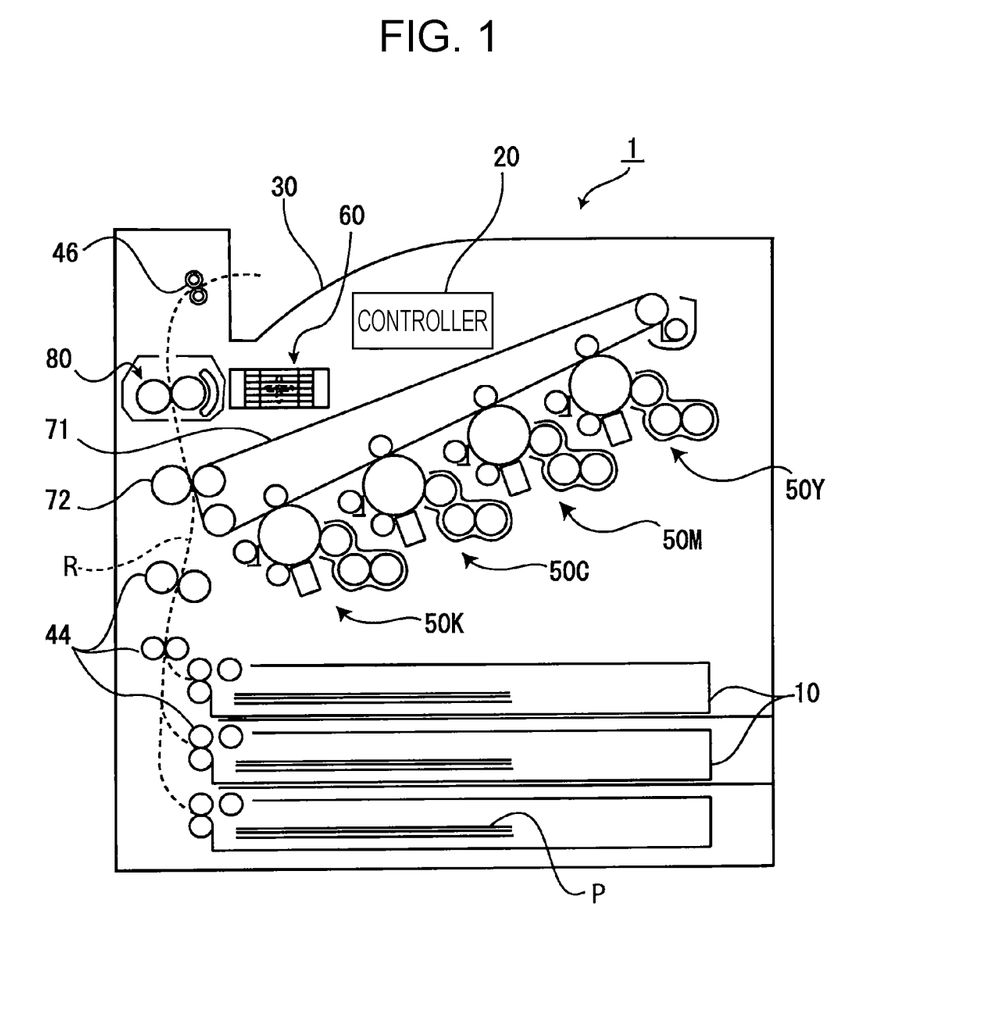
FIG. 1 is a schematic diagram of a printer corresponding to an image forming apparatus according to a first exemplary embodiment.

FIG. 1 is a schematic diagram of a printer 1 corresponding to an image forming apparatus according to a first exemplary embodiment.

The printer 1 illustrated in FIG. 1 is a so-called tandem color printer.

The printer 1 includes sheet trays 10 in each of which sheets P as recording materials on which images are to be recorded are stacked, and four image engines 50C, 50M, 50Y, and 50K that electrophotographically form toner images in four respective colors of cyan (C), magenta (M), yellow (Y), and black (K).

The toner images formed in the four respective colors by the four respective image engines 50C, 50M, 50Y, and 50K are transferred to an intermediate transfer belt 71 in such a manner as to be superposed one on top of another, whereby a color toner image is formed. The color toner image is then transferred to one of the sheets P by a transfer device 72. The sheet P is picked up from one of the sheet trays 10 and is transported along a transport path R to the transfer device 72 by relevant transport rollers 44.

The printer 1 includes a fixing device 80. When the sheet P having the color toner image transferred thereto is transported along the transport path R to the fixing device 80, the fixing device 80 fixes the color toner image to the sheet P by applying heat and pressure thereto.

The printer 1 includes an eject roller 46. The eject roller 46 ejects the sheet P having the fixed color toner image to the outside of the printer 1. The printer 1 includes a stacking tray 30 at the top of a housing thereof. The sheet P ejected by the eject roller 46 is stacked on the stacking tray 30.

The printer 1 includes a particle remover 60. The particle remover 60 collects airborne particles such as ultrafine particles (UFPs) contained in exhaust air to be exhausted after cooling the fixing device 80, thereby removing the airborne particles from the exhaust air. The particle remover 60 corresponds to an exemplary embodiment of the collecting device according to the present disclosure. The printer 1 further includes a controller 20 that controls the overall operation of the printer 1.

A combination of the four image engines 50C, 50M, 50Y, and 50K, the intermediate transfer belt 71, the transfer device 72, and the fixing device 80 corresponds to an example of the image forming unit according to the present disclosure.

Figure 2:
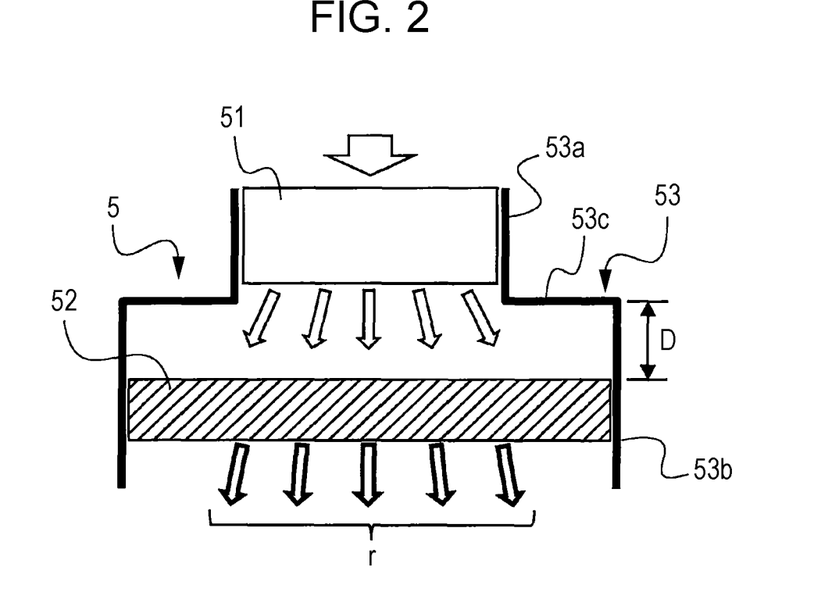
FIG. 2 illustrates a comparative embodiment of a collecting device.

FIG. 2 illustrates a comparative embodiment of the collecting device.

A particle remover 5 according to the comparative embodiment illustrated in FIG. 2 includes a fan 51 that sends cooling air, having flowed through the fixing device 80, as exhaust air to the outside of the housing of the printer 1; a filter 52 that collects particles contained in the exhaust air; and a duct 53 that guides the exhaust air from the fan 51 to the filter 52. The fan 51 is fitted in an inlet 53a of the duct 53. The filter 52 is fitted in an outlet 53b of the duct 53.

The filter 52 has a larger size than the fan 51. The duct 53 includes a wind tunnel 53c that widens the passage of the exhaust air from the fan 51 before the exhaust air reaches the filter 52. Since the passage of the exhaust air is widened, the speed of the exhaust air is reduced before the filter 52.

Figure 3:
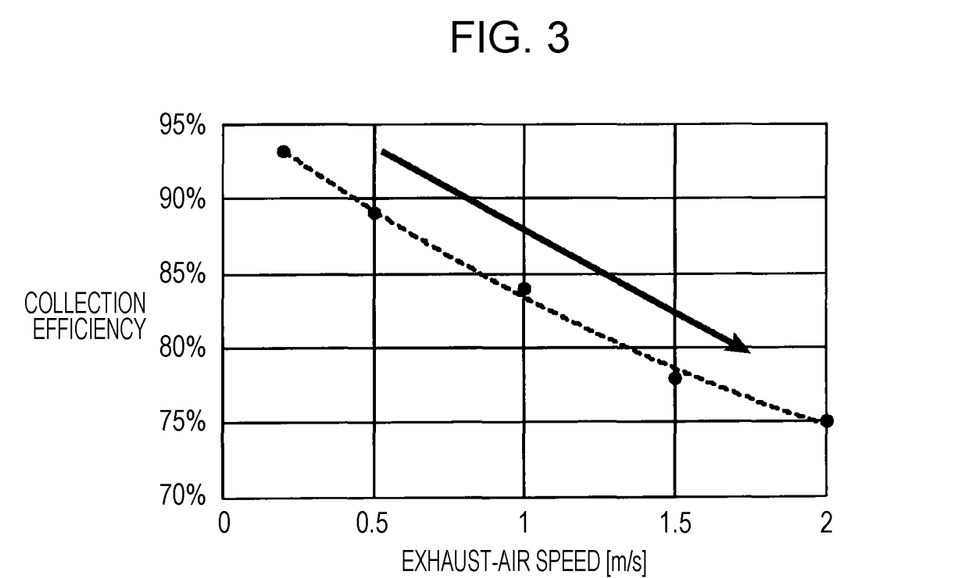
FIG. 3 is a graph illustrating a relationship between exhaust-air speed and collection efficiency.

FIG. 3 is a graph illustrating a relationship between the speed of the exhaust air and the collection efficiency.

In the graph illustrated in FIG. 3, the horizontal axis represents the speed of the exhaust air at the filter 52, and the vertical axis represents the efficiency of particle collection by the filter 52.

The graph illustrated in FIG. 3 forms a downward slope, which indicates that the higher the speed of the exhaust air, the lower the collection efficiency.

In the particle remover 5 according to the comparative embodiment illustrated in FIG. 2, if a length D (i.e. the distance in the direction in which the exhaust air flows) of the wind tunnel 53c is reduced with the size reduction of the printer 1 or for some other reason, an area r of the filter 52 in which the exhaust air passes through is reduced, that is, the exhaust air is received by only a limited part of the filter 52. Consequently, as represented by an arrow illustrated in FIG. 3, the speed of the exhaust air at the filter 52 increases, and the efficiency of particle collection is reduced.

Figure 4:
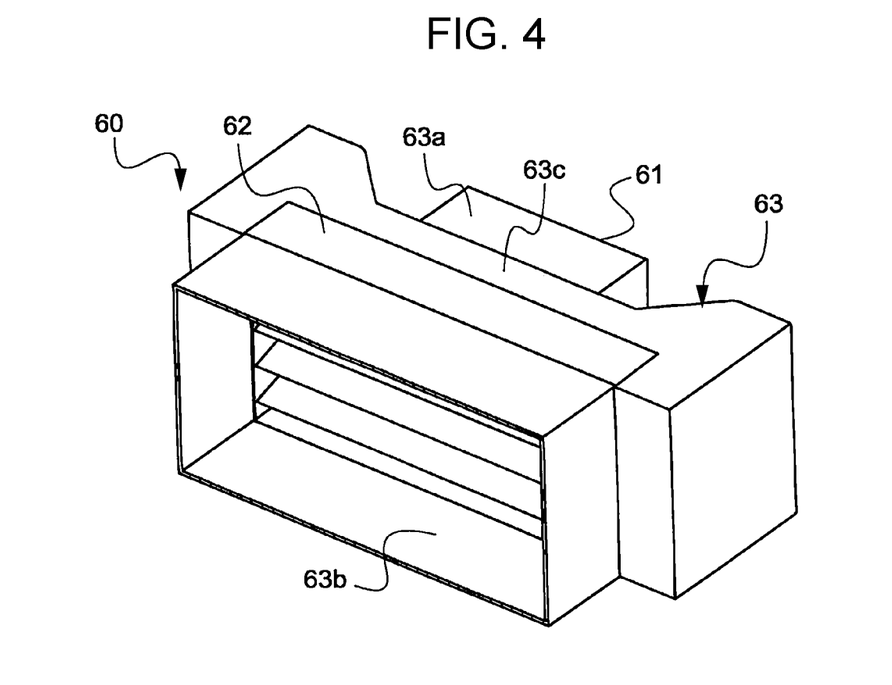
FIG. 4 is an external view of a particle remover according to the first exemplary embodiment.
Figure 5:
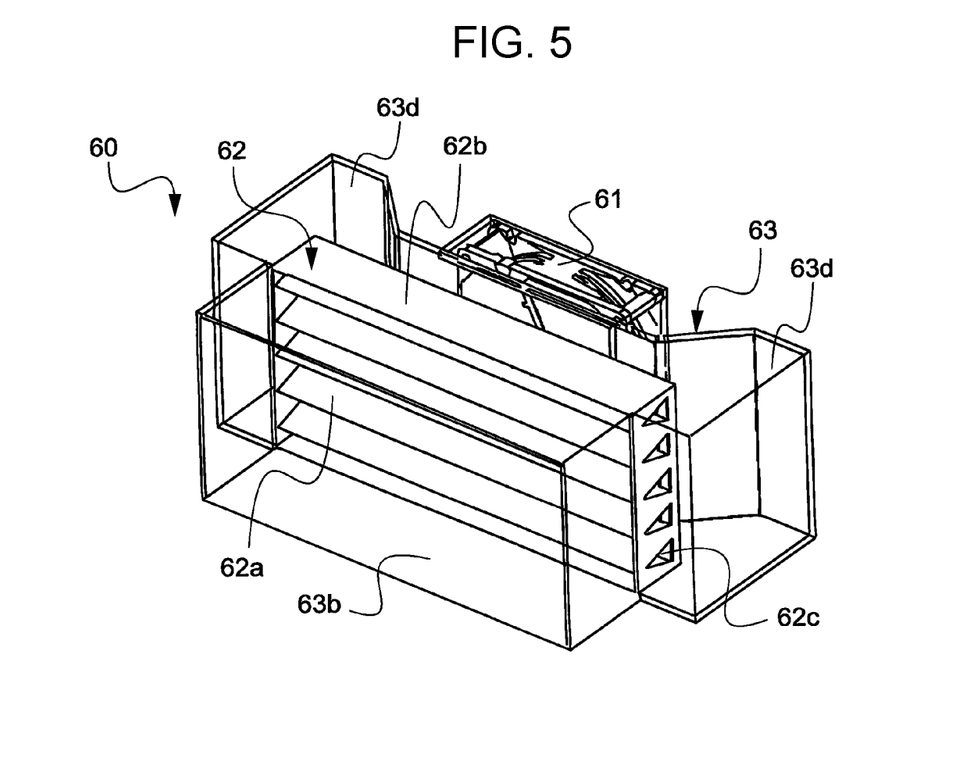
FIG. 5 is a skeleton view of the particle remover according to the first exemplary embodiment.

FIGS. 4 and 5 illustrate the particle remover 60 according to the first exemplary embodiment. FIG. 4 is an external view of the particle remover 60. FIG. 5 is a skeleton view of the particle remover 60.

The particle remover 60 according to the first exemplary embodiment includes a fan 61 that sends cooling air, having flowed through the fixing device 80, as exhaust air to the outside of the housing of the printer 1; a filter 62 that collects particles contained in the exhaust air; and a duct 63 that guides the exhaust air from the fan 61 to the filter 62. The duct 63 has an inlet 63a through which the exhaust air is taken in, and an outlet 63b through which the exhaust air is discharged. The fan 61 is fitted in the inlet 63a of the duct 63. The filter 62 is fitted in the outlet 63b of the duct 63. Note that the collecting device according to the present disclosure may not necessarily include the fan 61. For example, the collecting device may be provided at any position where the exhaust air comes out, so that the exhaust air is allowed to naturally flow into the collecting device with the force exerted by the exhaust air itself.

The filter 62 of the particle remover 60 is a consumable component and is attachable to and detachable from the particle remover 60 through a part where an end of the filter 62 is visible in FIG. 4. The filter 62 includes a collector member 62a having pleats for increasing the collection area, and a frame member 62b enclosing the four sides of the collector member 62a and thus holding the collector member 62a by the periphery so as to reinforce the filter 62. The frame member 62b has ventilation holes 62c in portions thereof holding the short sides of the collector member 62a. The ventilation holes 62c are triangular, for example. The ventilation holes 62c each correspond to an example of the wind-passing portion according to the present disclosure.

The duct 63 has a wind tunnel 63c extending from the fan 61 to the filter 62, and return chambers 63d continuous with the ventilation holes 62c of the filter 62 and with the wind tunnel 63c. The return chambers 63d are provided at two respective ends, in a long-side direction, of the filter 62. In a short-side direction of the filter 62, the sizes of the filter 62 and the collector member 62a are equal to the size of the inlet 63a, and the exhaust air flowing from the inlet 63a to the collector member 62a is therefore neither widened nor narrowed.

Figure 6:
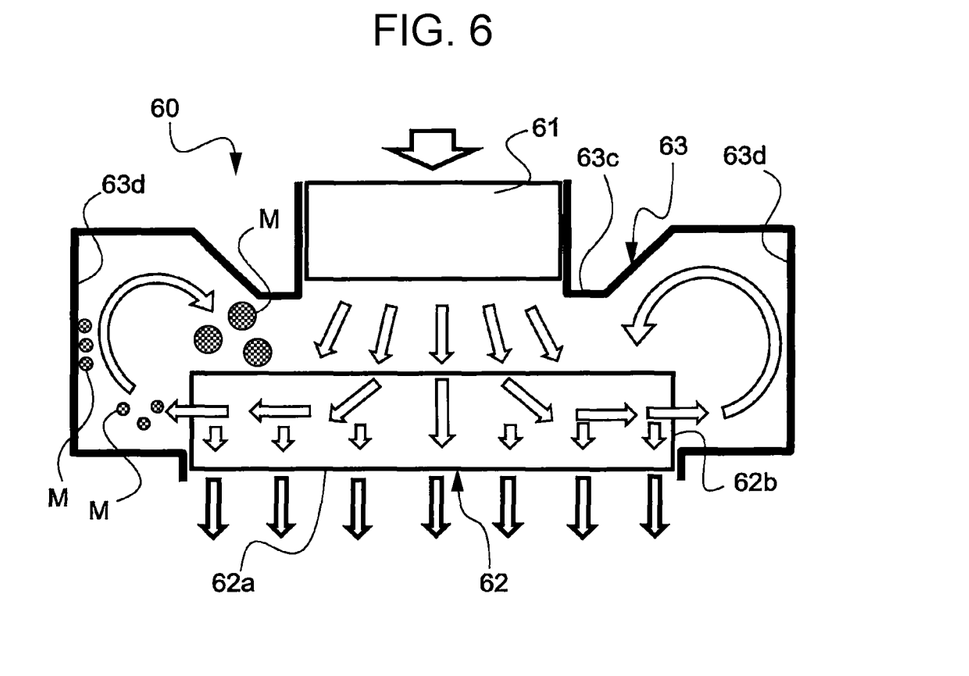
FIG. 6 illustrates a particle-collecting function of the particle remover according to the first exemplary embodiment.

FIG. 6 illustrates a particle-collecting function of the particle remover 60 according to the first exemplary embodiment.

The exhaust air sent into the particle remover 60 by the fan 61 flows toward the filter 62 and strikes the collector member 62a, where the exhaust air splits in the long-side direction (the horizontal direction in FIG. 6) of the filter 62 along creases in the collector member 62a toward the two ends. In the first exemplary embodiment, since the frame member 62b has the ventilation holes 62c (see FIG. 5), the split portions of the exhaust air flowing toward the two respective ends of the filter 62 are allowed to flow into the respective return chambers 63d of the duct 63 without being blocked by the frame member 62b. Herein, to block indicates to block the flow of air so that the exhaust air is not allowed to pass through the frame member 62b. In the first exemplary embodiment, the exhaust air is allowed to pass through the frame member 62b. Such a configuration facilitates the flow of the exhaust air along the creases in the collector member 62a. Consequently, the exhaust air spreads over the entirety of the collector member 62a of the filter 62. Hence, the speed of the exhaust air at the collector member 62a is reduced.

The exhaust air having reached each of the return chambers 63d of the duct 63 turns around therein, returns from the return chambers 63d into the wind tunnel 63c, and flows toward the filter 62 again. In the first exemplary embodiment, the frame member 62b has the ventilation holes 62c of an equal size at the two long-side ends of the filter 62, and the duct 63 has the return chambers 63d at the two long-side ends of the filter 62. Therefore, the exhaust air flowing from the fan 61 toward the collector member 62a splits evenly toward the two long-side ends of the filter 62, and the split portions of the exhaust air flow into the respective return chambers 63d.

Since the exhaust air turns around in the return chambers 63d, particles M contained in the exhaust air adhere to wall surfaces of the return chambers 63d or gather to form particles M of larger sizes. The particles M adhered to wall surfaces of the return chambers 63d are regarded as particles removed from the exhaust air.

Figure 7:
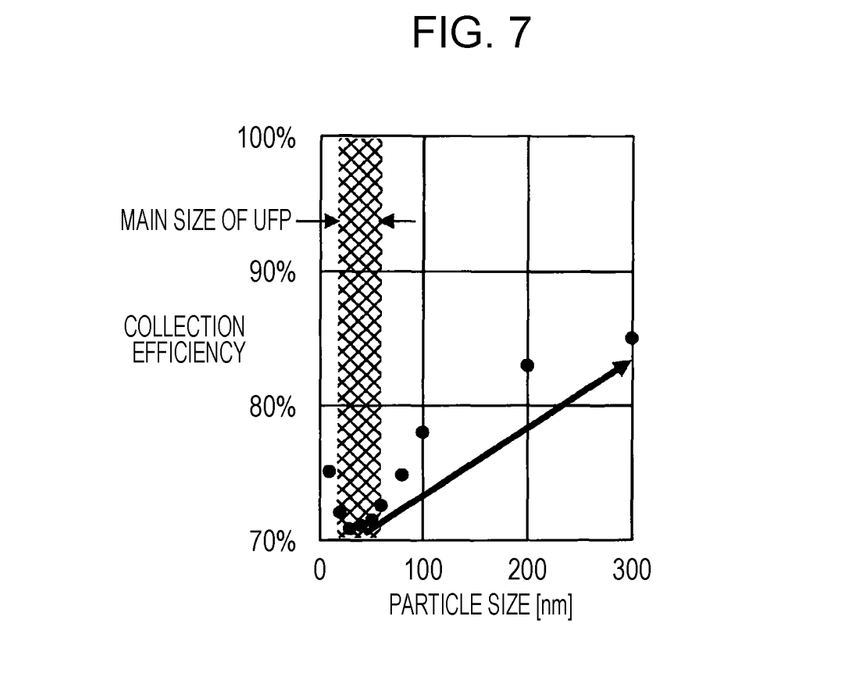
FIG. 7 is a graph illustrating a relationship between particle size and collection efficiency.

FIG. 7 is a graph illustrating a relationship between particle size and collection efficiency.

In FIG. 7, the horizontal axis represents the size of particles, and the vertical axis represents the collection efficiency of the collector member 62a.

The mostly observed size of so-called UFPs contained in the exhaust air ranges from ten nanometers to several tens of nanometers as hatched in the graph, and the collection efficiency of the collector member 62a for particles of such sizes is a little above 70% at most. In contrast, the collection efficiency for particles having sizes of about 100 nm is higher, nearly 80%, and the collection efficiency for particles having sizes of about 200 nm exceeds 80%.

Now, other examples of the wind-passing portion according to the present disclosure will be described.

Figure 8:
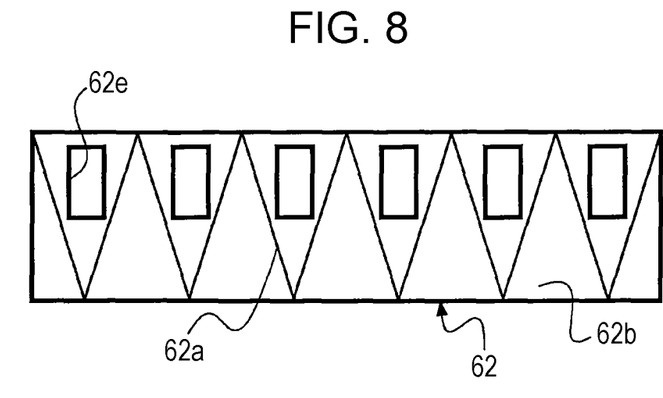
FIG. 8 illustrates rectangular ventilation holes as an example of a wind-passing portion.
Figure 9:
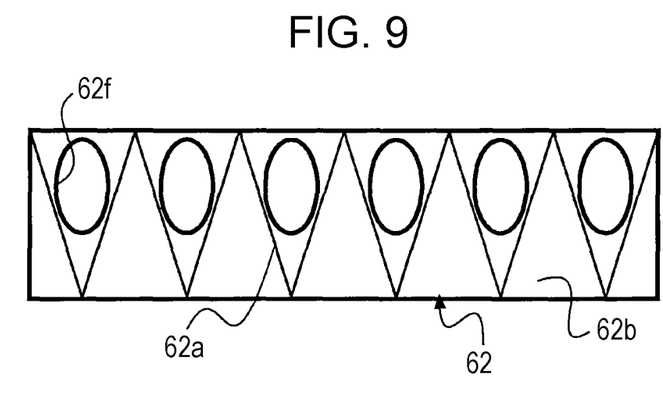
FIG. 9 illustrates oval ventilation holes as another example of the wind-passing portion.
Figure 10:
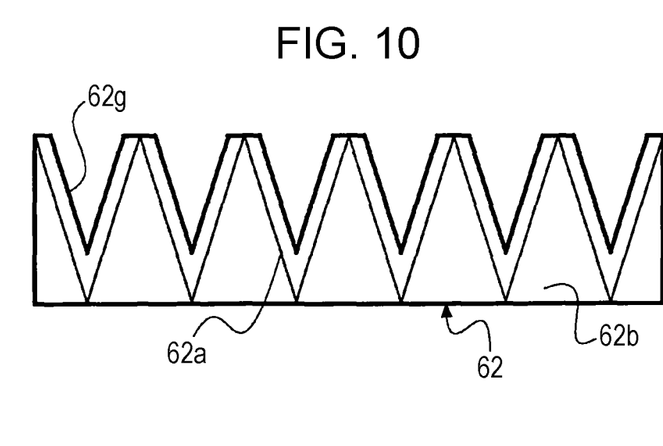
FIG. 10 illustrates notches as yet another example of the wind-passing portion.

FIGS. 8 to 10 illustrate other examples of the wind-passing portion.

The first exemplary embodiment described above concerns a case where triangular ventilation holes each serve as the wind-passing portion. FIG. 8 illustrates an example where the frame member 62b has rectangular ventilation holes 62e each serving as the wind-passing portion. In the case of such rectangular ventilation holes 62e as well, the exhaust air flowing along the pleated collector member 62a is allowed to pass through the frame member 62b. That is, the exhaust air passes through the rectangular ventilation holes 62e of the frame member 62b.

FIG. 9 illustrates another example where the frame member 62b has oval ventilation holes 62f each serving as the wind-passing portion. The oval ventilation holes 62f each have no corners and therefore exhibit higher edge strength than rectangular ventilation holes 62e. On the other hand, for example, the size of the rectangular ventilation holes 62e is easily controllable. Therefore, the flow rate of the exhaust air at the ventilation holes 62e is easily controllable.

The above examples each concern a case where the wind-passing portion is a hole. FIG. 10 illustrates yet another example where the frame member 62b has notches 62g each serving as the wind-passing portion. In the case of the notches 62g as well, the exhaust air flowing along the collector member 62a is allowed to pass through the frame member 62b.

Regardless of the shape, any wind-passing portion in the form of a hole has an edge over the entirety thereof and therefore exhibits high edge strength. On the other hand, a wind-passing portion in the form of a notch is easy to make.

Now, particle removers according to other exemplary embodiments will be described. The particle removers according to the following exemplary embodiments are each applicable to the printer 1, in replacement of the particle remover 60 according to the first exemplary embodiment. In the following description, elements that are the same as those described above are denoted by corresponding ones of the reference numerals, and redundant description of those elements is omitted.

Figure 11:
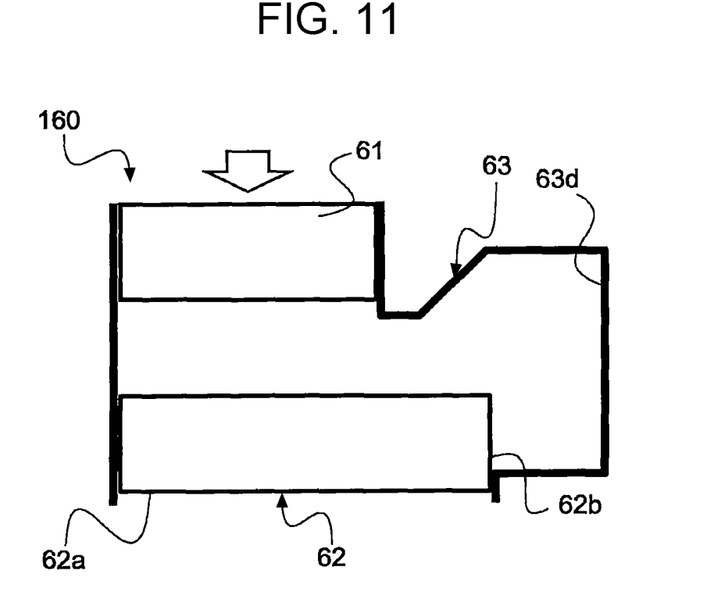
FIG. 11 illustrates a particle remover according to a second exemplary embodiment.

FIG. 11 illustrates a particle remover 160 according to a second exemplary embodiment.

As with the case of the first exemplary embodiment, the particle remover 160 according to the second exemplary embodiment illustrated in FIG. 11 includes a fan 61, a filter 62, and a duct 63. As with the case of the first exemplary embodiment, the filter 62 includes a collector member 62a and a frame member 62b. However, the duct 63 of the particle remover 160 according to the second exemplary embodiment has only one return chamber 63d provided on one long-side end of the filter 62.

If, for example, there is not enough space for providing two return chambers 63d on the two respective long-side ends of the filter 62 because of the positional relationship with the other elements provided in the printer 1, the particle remover 160 according to the second exemplary embodiment may be employed.

Moreover, in the particle remover 160 according to the second exemplary embodiment, the exhaust air sent by the fan 61 strikes a side of the collector member 62a that is opposite the side facing the return chamber 63d. In other words, the collector member 62a receives exhaust air flowing toward a position opposite the return chamber 63d. Such exhaust air decentered with respect to the collector member 62a and the single return chamber 63d together facilitate the movement of the exhaust air flowing along the collector member 62a toward the return chamber 63d.

Note that the frame member 62b of the filter 62 of the particle remover 160 according to the second exemplary embodiment may have ventilation holes on both long-side ends of the filter 62, as with the case of the first exemplary embodiment, or only on the side where the return chamber 63d is provided.

Figure 12:
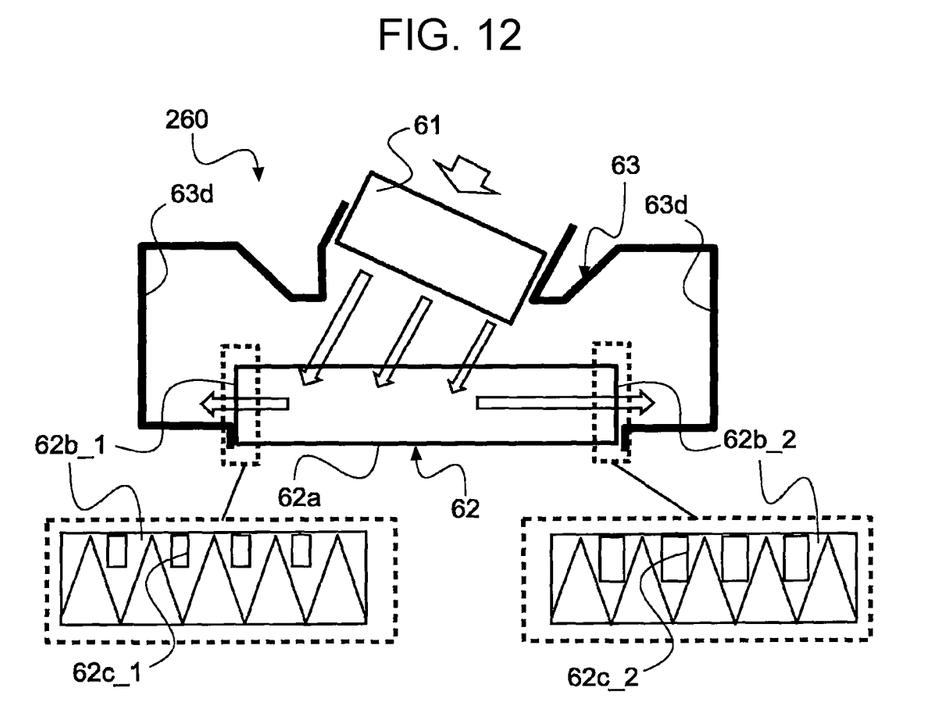
FIG. 12 illustrates a particle remover according to a third exemplary embodiment.

FIG. 12 illustrates a particle remover 260 according to a third exemplary embodiment.

As with the case of the first exemplary embodiment, the particle remover 260 according to the third exemplary embodiment illustrated in FIG. 12 includes a fan 61, a filter 62, and a duct 63. As with the case of the first exemplary embodiment, the filter 62 includes a collector member 62a and a frame member 62b. As with the case of the first exemplary embodiment, the duct 63 has return chambers 63d at two respective long-side ends of the filter 62. However, in the particle remover 260 according to the third exemplary embodiment, the direction in which the fan 61 sends the exhaust air is inclined with respect to the collector member 62a of the filter 62. For example, the exhaust air is sent in a direction inclined in such a manner as to flow toward one long-side end of the filter 62.

The filter 62 includes frame members 62b_1 and 62b_2 having rectangular ventilation holes 62c_1 and 62c_2, respectively. Lower part of FIG. 12 illustrates the frame members 62b_1 and 62b_2 seen in the long-side direction of the filter 62.

In the particle remover 260 according to the third exemplary embodiment, the size of the ventilation holes 62c_1 provided in the frame member 62b_1 on the one side toward which the exhaust air is sent is smaller than the size of the ventilation holes 62c_2 provided in the frame member 62b_2 on the other side. Therefore, while the exhaust air that has struck the collector member 62a of the filter 62 is facilitated to flow toward the one side because of the inclination thereof with respect to the collector member 62a, the same exhaust air is also facilitated to flow toward the other side because of the size difference between the ventilation holes 62c_1 and 62c_2. Consequently, the amounts of split portions of the exhaust air flowing toward the two respective long-side ends of the filter 62 become substantially the same. Accordingly, the amounts of split portions of the exhaust air flowing into the two respective return chambers 63c and turning around therein also become substantially the same.

The above description concerns a case where the filter and the collecting device according to the present disclosure are each a device that collects particles contained in exhaust air blown from the fixing device. Alternatively, the filter and the collecting device according to the present disclosure may each be another device that collects particles contained in exhaust air blown from an image engine or the like instead of the fixing device, or may each be a device included in an apparatus other than an image forming apparatus.

The present disclosure has been conceived to address the problem described in "Summary" but is not hindered from being used to achieve another object instead of addressing the above problem. Any of such embodiments conceived by the application of the present disclosure is regarded as an exemplary embodiment of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A filter comprising:
    a collecting member that has a pleat and collects particles while allowing wind to pass through; and
    a holding member that holds the pleat at an end in an elongated direction in which the pleat is elongated, the holding member having a wind-passing portion through which wind flowing along the pleat and exiting through a short-side surface of the collecting member is allowed to pass.

2. The filter according to claim 1, wherein a long-side direction of the collecting member corresponds to the elongated direction.

3. The filter according to claim 2, wherein a size of the collecting member in a short-side direction is equal to a size of a blowhole from which the wind is sent.

4. The filter according to claim 1, wherein the holding member holds the pleat at two ends in the elongated direction and has the wind-passing portion at each of the two ends.

5. The filter according to claim 2, wherein the holding member holds the pleat at two ends in the elongated direction and has the wind-passing portion at each of the two ends.

6. The filter according to claim 3, wherein the holding member holds the pleat at two ends in the elongated direction and has the wind-passing portion at each of the two ends.

7. The filter according to claim 4,
    wherein the collecting member receives the wind at a central part in the elongated direction, and
    wherein opening sizes of the wind-passing portions at the two respective ends of the holding member are equal.

8. The filter according to claim 4,
    wherein the collecting member receives the wind sent in a direction inclined toward one side in the elongated direction, and
    wherein one of the wind-passing portions at the two respective ends of the holding member that is on the side toward which the wind is sent has a smaller opening size than an other of the wind-passing portions.

9. The filter according to claim 1, wherein the holding member holds the pleat at two ends in the elongated direction and has the wind-passing portion at one of the two ends.

10. The filter according to claim 2, wherein the holding member holds the pleat at two ends in the elongated direction and has the wind-passing portion at one of the two ends.

11. The filter according to claim 3, wherein the holding member holds the pleat at two ends in the elongated direction and has the wind-passing portion at one of the two ends.

12. The filter according to claim 9, wherein the collecting member receives the wind sent toward an other end of the collecting member that is opposite the one end.

13. The filter according to claim 1, wherein the wind-passing portion is a hole provided in the holding member.

14. The filter according to claim 1, wherein the wind-passing portion is a notch provided in the holding member.

15. A collecting device comprising:
    a collecting member that has a pleat and collects particles while allowing wind to pass through;
    a holding member that holds the pleat at an end in an elongated direction in which the pleat is elongated, the holding member having a wind-passing portion through which wind flowing along the pleat and exiting through a short-side surface of the collecting member is allowed to pass; and
    a return chamber into which the wind passing through the wind-passing portion flows and that causes the wind to return toward an upstream side of the wind flowing toward the collecting member.

16. The collecting device according to claim 15,
    wherein the holding member holds the pleat at two ends in the elongated direction and has the wind-passing portion at each of the two ends, and
    wherein the return chamber is provided at each of the two ends in the elongated direction.

17. The collecting device according to claim 15,
    wherein the holding member holds the pleat at two ends in the elongated direction and has the wind-passing portion at one of the two ends, and
    wherein the return chamber is provided at the one end.

18. An image forming apparatus comprising:
    an image forming unit that generates wind while forming an image, the wind containing particles; and
    a collecting device that collects the particles,
    wherein the collecting device includes
        a collecting member that has a pleat and collects particles while allowing wind to pass through;
        a holding member that holds the pleat at an end in an elongated direction in which the pleat is elongated, the holding member having a wind-passing portion through which wind flowing along the pleat and exiting through a short-side surface of the collecting member is allowed to pass; and
        a return chamber into which the wind passing through the wind-passing portion flows and that causes the wind to return toward an upstream side of the wind flowing toward the collecting member.

* * * * *